United States Patent
Walker et al.

(10) Patent No.: US 9,056,337 B2
(45) Date of Patent: Jun. 16, 2015

(54) AUTOMATED METHOD AND DEVICE FOR CLEANING OF BLENDED ICE MACHINE

(71) Applicant: The Delfield Company LLC, Mount Pleasant, MI (US)

(72) Inventors: Darrel Jay Walker, Mount Pleasant, MI (US); James Wallace Brown, Crestwood, KY (US); Travis James Krchmar, Harrison, MI (US)

(73) Assignee: THE DELFIELD COMPANY, LLC, Mt. Pleasant, MI (US)

( * ) Notice: Subject to any disclaimer, the term of this patent is extended or adjusted under 35 U.S.C. 154(b) by 0 days.

(21) Appl. No.: 13/724,715

(22) Filed: Dec. 21, 2012

(65) Prior Publication Data
US 2013/0174875 A1     Jul. 11, 2013

Related U.S. Application Data

(60) Provisional application No. 61/579,431, filed on Dec. 22, 2011.

(51) Int. Cl.
| | |
|---|---|
| *B67D 1/07* | (2006.01) |
| *B08B 3/04* | (2006.01) |
| *B08B 9/027* | (2006.01) |
| *A23G 9/30* | (2006.01) |

(52) U.S. Cl.
CPC .. *B08B 9/027* (2013.01); *A23G 9/30* (2013.01)

(58) Field of Classification Search
CPC ................ F25C 2400/12; F25B 47/00; B67D 2001/075; A23G 9/30
USPC ........... 134/22.1, 22.11, 22.18, 169 R, 169 C; 62/303
See application file for complete search history.

(56) References Cited

U.S. PATENT DOCUMENTS

| | | | | |
|---|---|---|---|---|
| 3,638,448 | A | * | 2/1972 | Raymer ........................ 62/233 |
| 5,289,691 | A | | 3/1994 | Schlosser et al. |
| 6,311,501 | B1 | | 11/2001 | Allison et al. |
| 6,619,051 | B1 | | 9/2003 | Kilawee et al. |
| 6,725,675 | B2 | | 4/2004 | Kampert et al. |
| 7,281,386 | B2 | | 10/2007 | McDougal et al. |

FOREIGN PATENT DOCUMENTS

JP     2005274020 A   *   10/2005

OTHER PUBLICATIONS

English abstract of JP 2005-274020A, Inada et al., 2005.*
International Search Report dated Mar. 4, 2013 for PCT application No. PCT/US2012/071320.
Written Opinion Report dated Mar. 4, 2013 for PCT application No. PCT/US2012/071320.
International Preliminary Report on Patentability (IPRP) dated Nov. 27, 2013 from corresponding PCT/US2012/71320, pp. 8.
Patent Examination Report No. 1 dated Dec. 22, 2014 from corresponding Australian Patent Application No. 2012358305, pp. 3.

* cited by examiner

*Primary Examiner* — Michael Kornakov
*Assistant Examiner* — Natasha Campbell
(74) *Attorney, Agent, or Firm* — Ohlandt, Greeley, Ruggiero & Perle, L.L.P.

(57) ABSTRACT

The disclosure shows a device and method for automating the cleaning/sanitizing of the water and ice making system on a blended ice machine. The method eliminates the need to disassemble the unit in order to gain system access points to introduce cleaning and or sanitizing solutions. The method also automates the sequence of events required to insure cleaning is done according to a proven method.

17 Claims, 2 Drawing Sheets

AUTOMATED METHOD AND DEVICE FOR CLEANING OF BLENDED ICE MACHINE

RELATED APPLICATION

This application claims the priority of U.S. Provisional Patent Application Ser. No. 61/579,431, filed on Dec. 22, 2011, the entire contents of which are incorporated herein.

FIELD OF THE DISCLOSURE

This disclosure relates to a method and device for cleaning an ice making machine and, in particular, a blended ice making machine.

BACKGROUND OF THE DISCLOSURE

The closed water supply system of a blended ice machine may contain ice making, rinsing and water dispensing subsystems that require periodic cleaning, de-scaling and sanitizing. These systems normally require the disassembly of components in order to perform the required tasks to properly clean and sanitize the system.

There is a need for cleaning a blended ice making machine without disassembling components of the machine.

SUMMARY OF THE DISCLOSURE

A blended ice making machine according to the present disclosure comprises a gas inlet, a water inlet, a refrigerant circuit, and a cleaning device. The refrigerant circuit comprises an evaporator and a water circuit. The water circuit comprises a water reservoir, a drain pan and connections that interconnect the water reservoir, the drain pan and the water inlet to provide water to the evaporator. The cleaning device comprises a gas driven pump and a source of cleansing liquid and connections that connect the gas driven pump and the source of cleansing liquid to the water inlet to provide the cleansing liquid to the water circuit. A controller activates a cleaning sequence through a user-interface that prompts the user to perform a series of steps. The controller also controls the flow of the cleansing liquid from the source of cleansing liquid through the water circuit and the refrigerant circuit to clean and purge the water circuit and the refrigerant circuit.

In one embodiment of the ice machine according to the present disclosure, the ice machine comprises a refrigerant circuit, a water circuit interconnected with the refrigerant circuit and a cleaning device that comprises a pump. A controller (a) activates a cleaning operation through a user-interface, (b) prompts a user to perform one or more of a series of steps of the cleaning operation and (c) controls the pump to provide a cleansing liquid through the water circuit to clean and purge the water circuit and the refrigerant circuit.

In another embodiment of the ice machine according to the present disclosure, an ice bin is provided. One of the steps prompts the user to remove ice from the ice bin. The cleansing liquid is provided to the ice bin after the ice is removed.

In another embodiment of the ice machine according to the present disclosure connections connect the water circuit and the ice bin with the cleaning device and one or more valves that the controller controls to provide the cleansing liquid to the water circuit and the ice bin.

In another embodiment of the ice machine according to the present disclosure the controller during the cleaning operation further controls the refrigerant circuit to make ice with the cleansing liquid for a predetermined time. The series of steps comprise (a) connecting and disconnecting of the cleaning device and the water circuit with the water source, connecting and disconnecting the ice bin with the cleaning device, the water inlet and the gas inlet, (b) draining or purging of water from the water circuit, and (c) removing from the ice bin any ice made during the predetermined time.

In another embodiment of the ice machine according to the present disclosure one of the steps prompts the user to provide a supply of the cleansing liquid to be pumped by the pump to the water circuit.

In another embodiment of the ice machine according to the present disclosure the cleaning device has a location selected from the group consisting of: inside the ice making machine and outside the ice making machine.

In another embodiment of the ice machine according to the present disclosure the cleansing liquid is selected from the group consisting of: a descaler, sanitizer, wash solution and clean water and a combination thereof.

In one embodiment of the method according to the present disclosure, an ice machine that comprises a refrigerant circuit and a water circuit interconnected with the refrigerant circuit, the method comprises:

activating a cleaning operation through a user-interface; prompting a user to perform one or more of a series of steps of the cleaning operation; and controlling a pump to provide a cleansing liquid through the water circuit to clean and purge the water circuit and the refrigerant circuit.

In another embodiment of the method according to the present disclosure, the ice making machine further comprises an ice bin, and the method further comprises:

prompting the user with one of the steps to remove ice from the ice bin; and providing the cleansing liquid to the ice bin after the ice is removed.

In another embodiment of the method according to the present disclosure, the ice making machine further comprises an ice bin. The method further comprises:

prompting the user with one of the steps to remove ice from the ice bin, and providing the cleansing liquid to the ice bin after the ice is removed.

In another embodiment of the method according to the present disclosure, the method further comprises:

controlling one or more connections that connect the water circuit and the ice bin with the cleaning device and one or more valves to provide the cleansing liquid to the water circuit and the ice bin.

In another embodiment of the method according to the present disclosure, the method further comprises:

during the cleaning operation further controlling the refrigerant circuit to make ice with the cleansing liquid for a predetermined time;

connecting and disconnecting of the cleaning device and the water circuit with the water source;

connecting and disconnecting the ice bin with the cleaning device, the water inlet;

draining or purging of water from the water circuit; and removing from the ice bin any ice made during the predetermined time.

In another embodiment of the method according to the present disclosure, one of the steps prompts the user to provide a supply of the cleansing liquid to be pumped by the pump to the water circuit.

In another embodiment of the method according to the present disclosure, the cleansing liquid is selected from the group consisting of: a descaler, sanitizer, wash solution and clean water and a combination thereof.

In another embodiment of the method according to the present disclosure, the method further comprises: presenting on a display of the user interface messages corresponding to the steps.

In another embodiment of the ice machine according to the present disclosure, the user interface comprises a display and the controller presents on the display messages corresponding to the steps.

BRIEF DESCRIPTION OF THE DRAWINGS

Other and further objects, advantages and features of the present disclosure will be understood by reference to the following specification in conjunction with the accompanying drawings, in which like reference characters denote like elements of structure and.

DESCRIPTION OF THE PREFERRED EMBODIMENT

It is contemplated that the device and method of the present disclosure can be implemented in a standalone ice making machine or in any machine that requires ice making. By way of example, the device and method of the present disclosure will be described herein for a blended ice making machine in which an ice making capability is implemented in a beverage blending machine.

Figure 1:
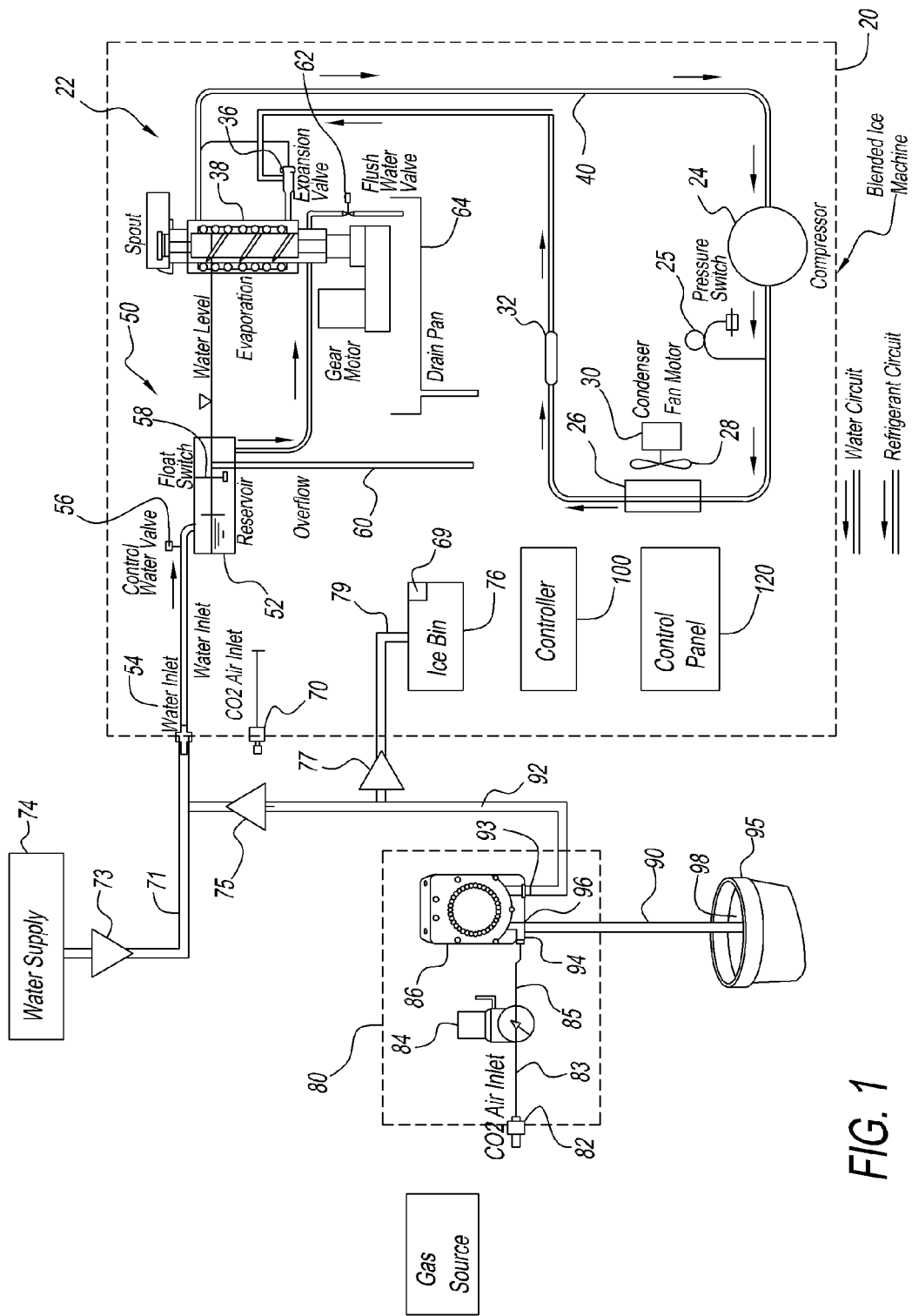
FIG. 1 is a block diagram of a blended ice machine with a cleaning device according to the present disclosure.

Referring to FIG. 1, a blended ice machine 20 comprises a refrigerant circuit 22, a water circuit 50, a cleaning device 80 and an ice bin 76. Refrigerant circuit 22 comprises a compressor 24, a pressure switch 25, a condenser 26, a drier 32, an expansion valve 36 and an evaporator 38 interconnected by piping 40 as shown. A motor 30 drives a fan 28 to provide cooling air to condenser 26.

Water circuit 50 comprises a water reservoir 52, a water inlet 54, a control valve 56, a float switch 58, an overflow pipe 60 and a drain pan 64. A connection 71 connects a water supply 74 to water inlet 54 via a valve 73. Valve 73 is open during an ice making operation to provide water to water circuit 50 for making ice. Valve 73 is closed during cleaning operations.

A gas inlet 70 is connectable to a source 72 of pressurized gas such as air or carbon dioxide.

Cleaning device 80 is connectable via connection 92 and connection 71 to water inlet 54 to clean the water circuit components and evaporator 38 with a cleansing liquid 98. A valve 75 is disposed in connection 92 and is open during cleaning operations and closed during ice making operations.

Cleansing liquid 98 may comprise a cleaning, sanitizing or a rinsing solution. For example, cleansing liquid 98 may contain a descaler, sanitizer, wash solution, clean water, or any other fluid used to remove contaminates. The cleansing liquid may also be a combination of any of these fluids.

Cleaning device 80 comprises a gas driven liquid or beverage pump 86 having a gas inlet 94, a liquid inlet 96 and a liquid outlet 93. An air pressure regulator 84 is connected via a connection 85 to gas input 94 of pump 86. Air regulator 84 is connected via connection 83 to a gas inlet 82 to receive pressurized gas from gas source 72. Liquid inlet 96 is connected directly to a hose 90, which can be connected directly to or submerged into a container 95 that holds cleansing liquid 98, which is capable of cleaning, sanitizing or rinsing. Liquid outlet 93 is connected via connection 92 and valve 75 to water inlet 54 of blended ice machine 20. Connection 92 may be a hose with a quick connected or other connection directly to water inlet 54. Connections 71, 79, 83, 85 and 92 may be conduits made of a suitable material, e.g., metal, plastic, rubber and the like.

A controller 100 controls refrigerant circuit 22 and water circuit 50 to make ice for storage in ice bin 76. Controller 100 also controls cleaning device 80 to provide a pressurized flow of cleansing liquid for in-place cleaning, sanitizing and rinsing of water circuit 50, refrigerant circuit 50 and ice bin 76. A control panel 120 allows a user to interact with blended ice machine 20 to initiate the cleaning sequence.

Figure 2:
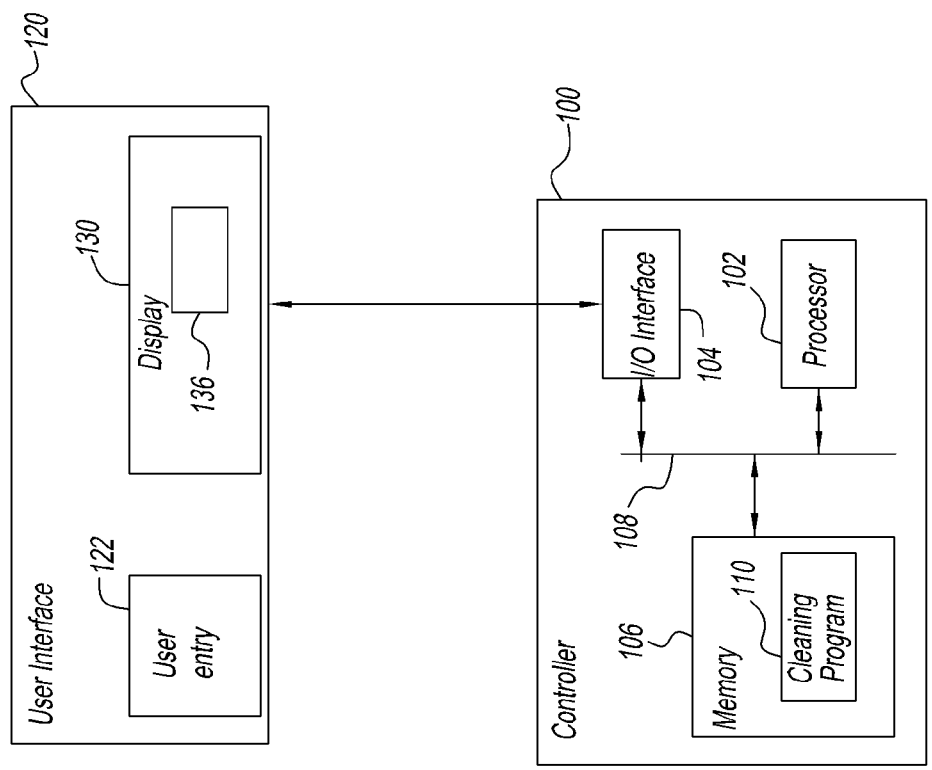
FIG. 2 is a block diagram of the controller and control panel of the blended ice machine with cleaning device of the present disclosure.

Referring to FIG. 2, controller 100 comprises a processor 102, an Input/Output (/O) interface 104 and a memory 106 interconnected via a bus 108. I/O interface 100 is connected to control panel 120 and to various components of blended ice making machine 20 for making ice. A cleaning program 110 is stored within memory 106. Processor 102 executes cleaning program 110 for cleaning water circuit 50 of blended ice making machine.

The execution of cleaning program 110 provides a method of several steps that interactively with a user introduces the cleansing liquid 98 for cleaning, sanitizing and/or rinsing water circuit 50 and refrigerant circuit 22 and then flushes cleansing liquid 98 from water circuit 50 and refrigerant circuit 22 in order to resume normal ice making, rinsing and dispensing functions. The method is accomplished in conjunction with user interface 120, which comprises a user entry location 122 and a display 130. In some embodiments, the user entry may be by touch screen activators on display screen 130.

Cleaning program 110 provides a series of messages on display 130 that require user interaction and/or other action. For example, the messages can be presented sequentially on a single screen or on sequentially presented screens or one or more on sequentially presented screens. The cleaning method can be activated by the user entering a command or activating a cleaning button (not shown) in user entry location 122. Alternately, cleaning program 110 can initiate the method with a message on display 130 that prompts the user to activate the cleaning method from user entry location 122. For a preferred embodiment, an exemplary series of messages is set forth below, which are presented in an area 136 of display 130 by controller 100 after initiation of a cleaning operation.

1. Message 1: Prompt the user to disconnect water inlet 54 from water supply 74 and gas inlet 70 from gas source 72. When this has been accomplished, the user can enter a done confirmation from user interface 120 and/or controller 100 can sense the disconnection of water inlet 54 and gas inlet 70.
2. Message 2. Prompt the user to drain water reservoir 52, which may be done by either user operation or solenoid activation of flush water valve 62. In either case, the user may enter from user interface 120 a done confirmation that water has been drained from water reservoir 52.
3, Message 3: Prompt the user to connect outlet 93 of pump 86 to water inlet 54 of water circuit 50 with hose 92. When done, the user may enter from user interface 120 a done confirmation that the connection has been achieved.
4. Message 4: Prompt the user to insert hose 90 into cleansing liquid 98. When done, the user may enter from user interface 120 a done confirmation that hose 90 is submerged in cleansing liquid 98.

5. Message 5: Prompt the user to connect gas inlet 82 to gas source 72 and pump device 86 via regulator 84. When done, the user may enter from user interface 120 a done confirmation that the connection has been achieved.
6. Message 6: Informs the user that controller 100 is operating blended ice machine 20 to make ice for a predetermined time interval. The time interval is predetermined to successfully clean and/or sanitize the ice machine. During this time interval dispense and rinse functions may be activated to flow the cleansing solution through water circuit 50 to cleanse, sanitize and/or rinse water reservoir 52, evaporator 38 drain pan 64 and purge the lines that interconnect these components.
7. Message 7: Prompt the user to disconnect gas inlet 82 from gas source 72 and then disconnect hose 92 from water inlet 54. When done, the user may enter from user interface 120 a done confirmation that these actions have been achieved.
8. Message 8: Prompt the user through user interface 120, to dispense and dispose of the ice made during step 7 from an ice bin (not shown). When done, the user may enter from user interface 120 a done confirmation that this action has been taken.
9. Message 9: Prompt the user to reconnect water inlet 54 to water supply 74 and gas inlet 70 to gas source 72. When done, the user may enter from user interface 120 a done confirmation that this action has been taken. Then controller 100 may resume ice making operation.

In an alternate embodiment, controller 100 may execute a cleaning cycle by controlling appropriate valves, e.g., valves 73, 75 and 77, the connections 71, 79 and 92 of pump 86 with water circuit 50 and ice bin 76 to provide appropriate cleansing liquid to clean, descale and or rinse them. In this embodiment the series of messages would be mostly informative with one or more that require active participation by the user. For example, the user would be prompted to fill bucket 95 with an appropriate cleaning fluid prior to a cleaning mode and to empty it at the conclusion of the cleaning mode and to remove ice from the ice bin.

Figure 3:
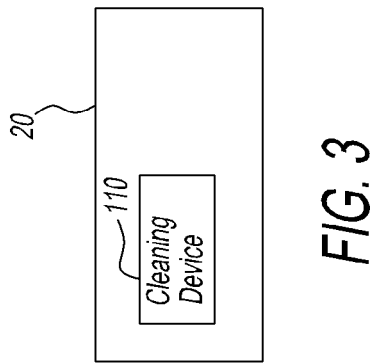
FIG. 3 is a block diagram of an alternate embodiment of the blended ice machine.

Referring to FIG. 3, in another alternate embodiment, cleaning device 80 is located within blended ice making machine 20. Bucket 95 (not shown in FIG. 3) may be located either outside or inside blended ice making machine 20.

The present disclosure having been thus described with particular reference to the preferred forms thereof, it will be obvious that various changes and modifications may be made therein without departing from the scope of the present disclosure as defined in the appended claims.

What is claimed is:

1. A blended beverage ice machine comprising:
   a refrigerant circuit;
   a water circuit in fluid communication with said refrigerant circuit;
   a water supply in fluid communication with said water circuit via a water inlet, wherein said water circuit is selectively connected to said water supply via a first valve;
   a cleaning device that comprises a pump, wherein said cleaning device and said pump are in fluid communication with said water circuit via said water inlet, and wherein said cleaning device is selectively connected to said water circuit via a second valve; and
   a processor, a memory, and a program stored on said memory, wherein said processor activates a cleaning operation through a user-interface and executes said program,
   wherein, during said cleaning operation, said program operates said first valve to disconnect said water circuit from said water supply, operates said second valve to connect said water circuit to said pump, operates said pump to provide a cleansing liquid through said water circuit to clean and purge said water circuit and said refrigerant circuit while said water circuit is disconnected from said water supply, and then ends said cleaning operation by reconnecting said water circuit to said water supply, and
   wherein said program prompts said user to perform one or more steps of said cleaning operation.

2. The blended beverage ice machine of claim 1, further comprising an ice bin, wherein one of said steps prompts said user to remove ice from said ice bin, and wherein said cleansing liquid is provided to said ice bin after said ice is removed.

3. The blended beverage ice machine of claim 2, wherein, during said cleaning operation, said program further operates said refrigerant circuit to make ice with said cleansing liquid for a predetermined time, and wherein said making of ice with said cleansing liquid for a predetermined time comprises (a) connecting and disconnecting of said cleaning device and said water circuit with said water supply, connecting and disconnecting said ice bin with said cleaning device, a water inlet and a gas inlet, (b) draining or purging of water from the water circuit, and (c) removing from said ice bin any ice made during said predetermined time.

4. The blended beverage ice machine of claim 1, wherein one of said steps prompts said user to provide a supply of said cleansing liquid to be pumped by said pump to said water circuit.

5. The blended beverage ice machine of claim 1, wherein said cleaning device has a location selected from the group consisting of: inside said blended beverage ice machine and outside said blended beverage ice machine.

6. The blended beverage ice machine of claim 1, wherein said cleansing liquid is selected from the group consisting of: a descaler, sanitizer, wash solution and clean water and a combination thereof.

7. A method of cleaning a blended beverage ice machine, the blended beverage ice machine comprising:
   a refrigerant circuit;
   a water circuit in fluid communication with said refrigerant circuit;
   a water supply in fluid communication with said water circuit via a water inlet, wherein said water circuit is selectively connected to said water supply via a first valve; and
   a cleaning device that comprises a pump, wherein said cleaning device and said pump are in fluid communication with said water circuit via said water inlet, and wherein said cleaning device is selectively connected to said water circuit via a second valve,
   the method comprising the steps of:
   connecting and disconnecting said water circuit to said water supply;
   activating a cleaning operation with a processor, a memory, and a program stored on said memory, and through a user-interface, wherein said processor executes said program;
   operating said pump to provide a cleansing liquid through said water circuit to clean and purge said water circuit and said refrigerant circuit, while said water circuit is disconnected from said water supply;
   prompting a user to perform one or more of a series of steps of said cleaning operation; and ending said cleaning operation by reconnecting said water circuit to said water supply.

8. The method of claim 7, wherein said blended beverage ice machine further comprises an ice bin, and further comprising:
prompting said user with one of said steps to remove ice from said ice bin; and
providing said cleansing liquid to said ice bin after said ice is removed.

9. The method of claim 8, further comprising:
during said cleaning operation further controlling said refrigerant circuit to make ice with said cleansing liquid for a predetermined time;
connecting and disconnecting of said cleaning device and said water circuit with said water supply;
connecting and disconnecting said ice bin with said cleaning device and said water inlet;
draining or purging of water from said water circuit; and
removing from said ice bin any ice made during said predetermined time.

10. The method of claim 7, wherein one of said steps prompts said user to provide a supply of said cleansing liquid to be pumped by said pump to said water circuit.

11. The method of claim 7, wherein said cleansing liquid is selected from the group consisting of: a descaler, sanitizer, wash solution and clean water and a combination thereof.

12. The method of claim 7, further comprising: presenting on a display of said user interface messages corresponding to said steps.

13. The blended beverage ice machine of claim 1, wherein said user interface comprises a display and said controller presents on said display messages corresponding to said steps.

14. The blended beverage ice machine of claim 1, wherein said cleaning device is within the blended beverage ice machine.

15. The blended beverage ice machine of claim 14, wherein said pump of said cleaning device further comprises a gas inlet, a liquid inlet in fluid communication with said cleansing liquid, and a liquid outlet, wherein during said cleaning operation, said pump provides said cleansing liquid to said water circuit through said liquid outlet.

16. The method of claim 7, wherein the blended beverage ice machine further comprises a cleaning device, wherein said cleaning device is within the blended beverage ice machine.

17. The method of claim 16, wherein said cleaning device further comprises a pump, wherein said pump further comprises a gas inlet, a liquid inlet in fluid communication with said cleansing liquid, and a liquid outlet, wherein during said cleaning operation, said pump provides said cleansing liquid to said water circuit through said liquid outlet.

* * * * *